UNITED STATES PATENT OFFICE

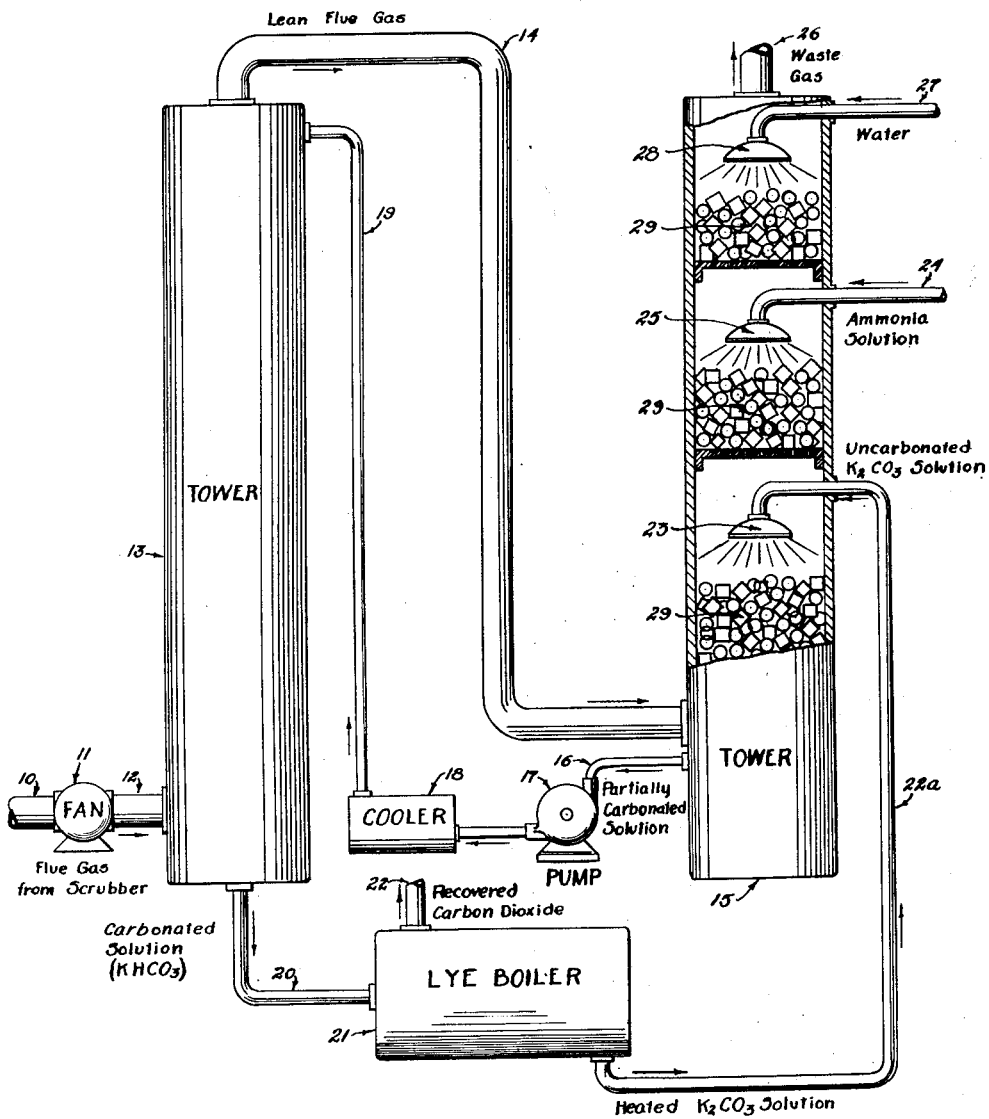

2,043,109

RECOVERY OF CARBON DIOXIDE FROM WASTE GASES

Ralph H. McKee and Ernest A. Winter, New York, N. Y., assignors to Macmar Corporation, New York, N. Y., a corporation of Delaware Application December 20, 1934, Serial No. 758,500

15 Claims. (Cl. 23—150)

This invention relates to the recovery of carbon dioxide from waste gases containing the same and more particularly to the treatment of flue gases or other waste gases such as those from a lime kiln, blast furnace or the like, to recover carbon dioxide substantially completely therefrom.

The principal object of the present invention is to provide a modification of the standard process of recovering carbon dioxide from waste gases whereby the recovery of carbon dioxide may be greatly increased.

An important object of the present invention is to provide an improved process of recovering substantially pure carbon dioxide from a gaseous mixture containing the same.

Other objects and advantages of the invention will become apparent during the course of the following description.

According to one of the most commonly used methods of making liquid carbon dioxide, anthracite coal or common coke is burned under a steam boiler and the flue gases are washed to free them from dust and the larger part of sulfur compounds. This is ordinarily accomplished by drawing the flue gases through a short tower filled with coke down which water passes. Other means for washing the gases are sometimes employed but the one described is the customary method. The washed gas, which has been cooled and washed by the water in the tower and is substantially dust-free and partially purified, is then passed through a series of absorption towers down which a potassium carbonate solution of about 16% strength is passed. The carbon dioxide passing up the towers is brought into contact with the potassium carbonate solution and is absorbed therein, converting the potassium carbonate ($K_2CO_3$) to potassium bicarbonate ($KHCO_3$). The resulting solution is drawn off from the towers and passed to a lye boiler where the solution is heated, driving off carbon dioxide gas with the reformation of potassium carbonate. The carbon dioxide driven off is passed through a gas holder and then to compressors where it is compressed, cooled, liquefied, and put into cylinders for shipment. In this process less than a fourth of the carbon dioxide present in the waste gases treated is absorbed by the potassium carbonate and the balance of the carbon dioxide escapes as waste gas from the final tower of the series. Thus, the standard process as above described does not provide the best commercial practice, as is apparent.

As a result of experiments directed to improving the conventional procedure referred to above, we have developed a modified process which while similar to the standard process is much more efficient in carbon dioxide absorption and, in fact, permits of practically complete removal of the carbon dioxide from the gas mixture being treated.

In its broad aspect, our improvement over the standard procedure of recovering carbon dioxide from waste gases resides in employing ammonia as an absorbent for carbon dioxide in conjunction with a solution of potassium carbonate customarily used as an absorbent for carbon dioxide. In our preferred process the waste gases to be treated are contacted with a solution of potassium carbonate for the purpose of removing from the waste gases as much carbon dioxide as possible and the unabsorbed carbon dioxide is then contacted in the presence of water with ammonia resulting in the formation of ammonium carbonate and/or ammonium bicarbonate solution which is then mixed with uncarbonated or incompletely carbonated potassium carbonate solution at a somewhat elevated temperature, resulting in the formation of a solution of potassium bicarbonate and the freeing of ammonia which is volatilized for reuse in the practice of the process, all as hereinafter set forth in detail.

In the accompanying drawing we have shown in diagrammatic form an assembly of apparatus which we have found to be particularly suitable for use in the practice of the process.

Referring to the accompanying drawing, partially purified flue gas is drawn from a conventional scrubber through the pipe 10 by means of the fan 11 and introduced through the pipe 12 into a tower 13 which is identical with the tower customarily employed in the standard procedure referred to above. The gases introduced into the tower through the pipe 12 are substantially free from dust and largely free of sulfur compounds and have been cooled to a temperature of about 20–25° C. as a result of the treatment in the conventional scrubber (not shown).

The waste gases introduced from the pipe 12 pass upwardly through the tower 13 in contact with a counter-current solution containing potassium carbonate and a portion of the carbon dioxide is absorbed by the solution, the potassium carbonate reacted upon by the carbon dioxide being converted into potassium bicarbonate. The lean waste gases pass out of the tower 13 at the top thereof and are delivered by means of the pipe 14 into the lower portion of a tower 15 and pass upwardly through the same in counter-current contact with a solution containing potassium carbonate which has been heated to a temperature of from 40 to 60° C., and preferably about 50° C. As a result of contact with the carbon dioxide, a portion of potassium carbonate will be converted into potassium bicarbonate. The resulting partially carbonated solution is withdrawn from the tower 15 through the pipe 16 by means of the pump 17 which forces the partially carbonated solution through the cooler 18 where the temperature of the solution is reduced to about 20° C. or 25° C., following which the solution is delivered through the pipe 19 into the upper end of the tower 13.

As pointed out above, further amounts of carbon dioxide are absorbed by the treating solution in the tower 13 and the resulting carbonated solution containing principally potassium bicarbonate is withdrawn from the tower 13 by the pipe 20 and delivered to a conventional lye boiler 21 where the solution is heated to drive off carbon dioxide through the pipe 22, converting the potassium bicarbonate into potassium carbonate. The resulting solution of potassium carbonate in unspent or uncarbonated condition is withdrawn from the lye boiler 21 by means of the pipe 22a and, after the lowering of the temperature thereof, as by cooling in any conventional manner, delivered, at a temperature between 40° C. and 60° C., preferably about 50° C., to a spray nozzle 23 which sprays the potassium carbonate solution downwardly through the tower 15.

A substantial portion of the carbon dioxide passing up the tower 15 will not be absorbed by the potassium carbonate solution delivered into the system from the spray 23. In order to absorb this otherwise waste portion of carbon dioxide, a water solution of ammonia is delivered through the pipe 24 to the spray nozzle 25, which is arranged adjacent the upper end of the tower 15. The previously unabsorbed carbon dioxide passing upwardly through the tower 15 is contacted with the ammonia solution sprayed downwardly through the tower from the nozzle 25. Ammonia combines rapidly and substantially completely with carbon dioxide gas with the formation of ammonium bicarbonate and ammonium carbonate. This reaction takes place, largely as a gas phase reaction, in the tower 15 and the ammonium bicarbonate and/or ammonium carbonate formed is dissolved in the water present and the resulting solution passes downwardly in the tower 15.

As the ammonium salt solution passes downwardly in the tower 15 it comes into contact with the potassium carbonate solution introduced from the nozzle 23. This solution is quite alkaline and at an elevated temperature. Upon contact of the ammonium salt solution with the potassium carbonate solution, potassium bicarbonate and free ammonia are formed. The ammonia freed by the reaction is vaporized due to the alkali present, the temperature, and the passage of the lean waste gases through the liquid. The upward passage of the waste gases, i. e. the blowing of the solution by the waste gases, tends to increase volatilization of the ammonia but not of the carbon dioxide inasmuch as the waste gases contain a substantial portion of carbon dioxide. While some carbon dioxide is volatilized simultaneously with the ammonia, the ratio is small. For example, for a solution such as would be present in the tower at a point slightly below the middle, there would be volatilized at a temperature of 50° C., as has been shown by repeated tests, about 18 molecules of ammonia for each molecule of carbon dioxide volatilized. At lower temperatures and at higher temperatures the ratio is not so high. For example, at 70° C. the ratio is of the order of 8:1 instead of 18:1. Therefore, it is recommended that the potassium carbonate solution sprayed from the nozzle 23 be introduced at a temperature between 40° C. and 60° C., and preferably at about 50° C.

The ammonia which is volatilized passes upwardly through the tower 15 in contact with the lean waste gases containing carbon dioxide and further amounts of carbon dioxide combine with the ammonia and the process is automatically repeated as described above. The ammonia repeatedly combines with the carbon dioxide and is repeatedly set free, thus serving in a sense as a catalyst for removing carbon dioxide from the gas phase and putting it into the liquid phase. As stated above, substantially all of the carbon dioxide put into solution as ammonium carbonate and/or ammonium bicarbonate remains in solution as potassium bicarbonate.

In order to prevent the loss of ammonia resulting from passing out of the tower 15 with the waste gases through the stack 26, a small amount of cold water is delivered by a pipe 27 to a spray nozzle 28 which sprays the water downwardly from the top of the tower 15. The amount of water introduced through the spray nozzle 28 is kept at the minimum which will prevent the escape of ammonia with the waste gases. This amount can readily be determined by periodically testing the waste gases for ammonia. Ordinarily, water vapor will be discharged from the tower 15 through the stack 26 at approximately the same rate that water is introduced into the system through the spray nozzle 28. Accordingly, there ordinarily will be no undesirable accumulation of water in the system to dilute the potassium carbonate solution employed. However, in the event that the potassium carbonate solution is diluted to an undesirable extent, a portion of the water can be evaporated during treatment of the carbonated solution in the lye boiler 21, thereby concentrating the solution of potassium carbonate discharged therefrom. Ordinarily, it is desirable that the potassium carbonate solution used as an absorbent for carbon dioxide be one carrying from 15 to 25% by weight of the salt in water. Stronger and weaker solutions are not so desirable as those in the range mentioned. Our preference is for a solution containing from 16 to 20% by weight of the salt in water. It is well known in the art that concentrated potassium carbonate does not absorb carbon dioxide so readily as a dilute solution. For example, a 25% solution of potassium carbonate will not absorb carbon dioxide so readily as a 16% solution. However, in the present process it is possible to use more concentrated solutions, such as the solution containing 25% by weight of potassium carbonate in water.

As will be apparent, the towers 13 and 15 should be provided with means for causing intimate contact of the gases being treated with the treating solution employed. In commercial units customarily employed in the standard procedure referred to above the towers have been filled with pieces of coke. While these will serve in the present process, it is not so efficient a method of bringing the gases in contact with the liquid present as providing the towers with plates and caps, Raschig rings or the like. The plate and cap construction, however, requires the overcoming of a considerable amount of back pressure and accordingly, we prefer to provide the towers with Raschig rings as indicated at 29.

The removal of carbon dioxide from the carbonated solution in the lye boiler 21 may be effected in the conventional manner employed in the standard process used at present. In the lye boiler the potassium bicarbonate solution is heated to a temperature of about 105° C., converting the potassium bicarbonate into potassium carbonate, giving off the carbon dioxide, some water and a small amount of ammonia. The carbon dioxide so produced and discharged through the pipe 22 is cooled and passed into a compressor. At each stage there is some water condensed as the gas is dried by compression. Before being run into the conventional cylinders, the gas is customarily dried by passing it through granular calcium chloride or similar material. In some instances this last drying may be omitted and the liquid carbon dioxide resulting and shipped commercially carries a small amount of liquid water as a layer underneath the liquid carbon dioxide. In the present process any of these portions of condensed water carrying ammonia would be used to return ammonia to the system through the pipe 24. Those portions of water carrying no ammonia would either be discarded or introduced into the pipe 27 for use in spraying the upper portion of the tower 15 with water.

While we prefer to employ a solution of potassium carbonate as the carbon dioxide absorbent, we may employ in place thereof other alkali metal compounds capable of reacting with ammonium carbonate and/or bicarbonate to form an alkali metal bicarbonate and free ammonia. For example, sodium carbonate solutions may be employed but the carbon dioxide is not so readily absorbed by a solution of sodium carbonate as it is by a solution of potassium carbonate since the solution must be more dilute in order to prevent separation of the less soluble bicarbonate.

While for commercial practice we prefer to introduce the unspent potassium carbonate solution into the tower 15 and thereafter pass it, in partially carbonated condition, into the tower 13 where it is brought into contact with the waste gases carrying the maximum amount of carbon dioxide, it will be apparent that this procedure may be reversed and the fresh potassium carbonate solution delivered into the top of the tower 13 and withdrawn therefrom and delivered into the tower 15. However, this is a less advantageous procedure and is not recommended for commercial use.

As will be apparent, instead of employing the two towers 13, 15, the tower 13 may be omitted and the strong flue gas introduced directly into the lower portion of 15. In such case the tower 15 would function in the same manner as described above but, as will be apparent, the recovery of carbon dioxide will be somewhat lower than in the preferred process described above.

While we have described in detail the preferred practice of our process it is to be understood that the form of apparatus and the details of procedure may be variously modified without daparting from the spirit of the invention or the scope of the subjoined claims.

We claim:

1. In a process of purifying impure carbon dioxide the improvement which comprises separating carbon dioxide from impurities present therewith by absorbing a portion of the carbon dioxide by reacting it with a portion of alkali metal carbonate present in a solution thereof with the consequent formation of an alkali metal bicarbonate and by absorbing another portion of the carbon dioxide by reacting it with ammonia in the presence of water with the consequent formation of an ammonium salt of carbonic acid, and reacting said ammonium salt with unreacted upon alkali metal carbonate present in said solution thereof to produce a further amount of said alkali metal bicarbonate.

2. The process of recovering carbon dioxide from gaseous mixtures containing the same which comprises contacting the gaseous mixture under treatment with a solution of an alkali metal carbonate, contacting the remaining gaseous mixture with a solution of ammonia, and mixing the resulting solution with said first named solution.

3. The process of recovering carbon dioxide from gaseous mixtures containing the same which comprises contacting the gaseous mixture under treatment with a solution of potassium carbonate, contacting the gaseous mixture remaining after such treatment with a solution of ammonia, and mixing the resulting solution with said first named solution.

4. The process of recovering carbon dioxide from gaseous mixtures containing the same which comprises passing the gaseous mixture through a solution of an alkali metal carbonate at a temperature of 40° C. to 60° C., contacting the gaseous mixture remaining after such treatment with a solution of ammonia, and mixing the resulting solution with said first named solution.

5. The process of recovering carbon dioxide from gaseous mixtures containing the same which comprises contacting the gaseous mixture under treatment with a solution of potassium carbonate at a temperature of from 40° C. to 60° C., contacting the gaseous mixture remaining after such treatment with a solution of ammonia, and mixing the resulting solution with said first named solution.

6. In a process of separating carbon dioxide from gaseous mixtures containing the same, the cyclic procedure which comprises contacting a gaseous mixture containing carbon dioxide with ammonia in the presence of water to produce a solution containing an ammonium salt of carbonic acid, maintaining in solution the carbon dioxide content of said ammonium salt while liberating ammonia therefrom by mixing with said ammonium salt in solution an alkali metal compound which reacts with the ammonium salt to form an alkali metal bicarbonate and ammonia, volatilizing ammonia from the resulting solution, and contacting the same in the presence of water with further amounts of gaseous mixture containing carbon dioxide in the further practice of the process.

7. In a process of separating carbon dioxide from gaseous mixtures containing the same, the cyclic procedure which comprises contacting a gaseous mixture containing carbon dioxide with ammonia in the presence of water to produce a solution containing ammonium bicarbonate, maintaining in solution the carbon dioxide content of said ammonium bicarbonate while liberating ammonia therefrom by mixing with said ammonium bicarbonate in solution an alkali metal carbonate to form an alkali metal bicarbonate and ammonia, volatilizing ammonia from the resulting solution, and contacting the same in the presence of water with further amounts of gaseous mixture containing carbon dioxide in the further practice of the process.

8. In a process of separating carbon dioxide from gaseous mixtures containing the same, the cyclic procedure which comprises contacting a gaseous mixture containing carbon dioxide with ammonia in the presence of water to produce a solution containing ammonium bicarbonate, maintaining in solution the carbon dioxide content of said ammonium bicarbonate while liberating ammonia therefrom by mixing with said ammonium bicarbonate in solution a solution of potassium carbonate to form potassium bicarbonate and ammonia, blowing ammonia from the resulting solution by means of a current of gas, and contacting the ammonia in the presence of water with further amounts of gaseous mixture containing carbon dioxide in the further practice of the process.

9. In a process of the character described, the cyclic procedure which comprises contacting carbon dioxide with ammonia in the presence of water, mixing the resulting solution with a solution of an alkali metal carbonate at a temperature of from 40° C. to 60° C., and contacting the ammonia thereby volatilized in such treatment with further amounts of carbon dioxide in the presence of water in the further practice of the process.

10. In a process of the character described, the cyclic procedure which comprises contacting carbon dioxide with ammonia in the presence of water, mixing the resulting solution with a solution of potassium carbonate at a temperature of from 40° C. to 60°., and contacting the ammonia thereby volatilized in such treatment with further amounts of carbon dioxide in the presence of water in the further practice of the process.

11. In a process of the character described, the steps comprising passing a gas mixture containing carbon dioxide through, and absorbing carbon dioxide present in said gas mixture by, a solution of an alkali metal carbonate having a temperature of from 40° C. to 60° C., and simultaneously mixing with such solution a solution containing ammonium bicarbonate.

12. In a process of the character described, the steps comprising passing a gas mixture containing carbon dioxide through, and absorbing carbon dioxide present in said gas mixture by, a solution of potassium carbonate having a temperature of from 40° C. to 60° C., and simultaneously mixing with such solution a solution containing ammonium bicarbonate.

13. The process of recovering substantially pure carbon dioxide from flue gas which comprises scrubbing said flue gas, contacting the resulting gas with a solution containing potassium carbonate at a temperature of about 20° C. to 25° C., contacting the lean flue gas remaining after such treatment with a solution of potassium carbonate at a temperature of from 40° C. to 60° C., contacting the gas remaining after such treatment with ammonia in the presence of water, mixing the resulting solution with said solution having a temperature of from 40° C. to 60° C., and heating the solution of potassium bicarbonate formed in the process to convert the same to potassium carbonate for further use in the practice of the process and to free carbon dioxide in substantially pure condition.

14. The process of separating carbon dioxide from a gaseous mixture containing the same which comprises partially filling a tower with a solution of an alkali metal carbonate, introducing ammonia and water into said tower above the level of said alkali metal carbonate solution, introducing into said tower below the level of said alkali metal carbonate solution a current of said gaseous mixture, and discharging waste gases from said tower.

15. The process of separating carbon dioxide from a gaseous mixture containing the same which comprises introducing into a tower at a point spaced from the top thereof a solution of an alkali metal carbonate at a temperature between approximately 40° C. and 60° C., introducing ammonia and water into said tower, introducing into said tower at a point below the point of introduction of said alkali metal carbonate solution a gaseous mixture containing carbon dioxide, passing the portion of said gaseous mixture not absorbed by said alkali metal carbonate solution upwardly in said tower in contact with ammonia in the presence of water, discharging waste gases from the upper portion of said tower, and withdrawing liquid present from the lower portion of said tower.

RALPH H. McKEE.
ERNEST A. WINTER.